June 10, 1958 G. B. FOX ET AL 2,838,083
VEGETABLE PEELER HAVING SPRAY DISPERSER
Filed Sept. 12, 1955 4 Sheets-Sheet 1

INVENTORS
GERALD B. FOX,
FRANKLIN D. HOUSER &
BY DAVID A. MEEKER

Marechal, Biebel, Bunch y Bugg
ATTORNEYS

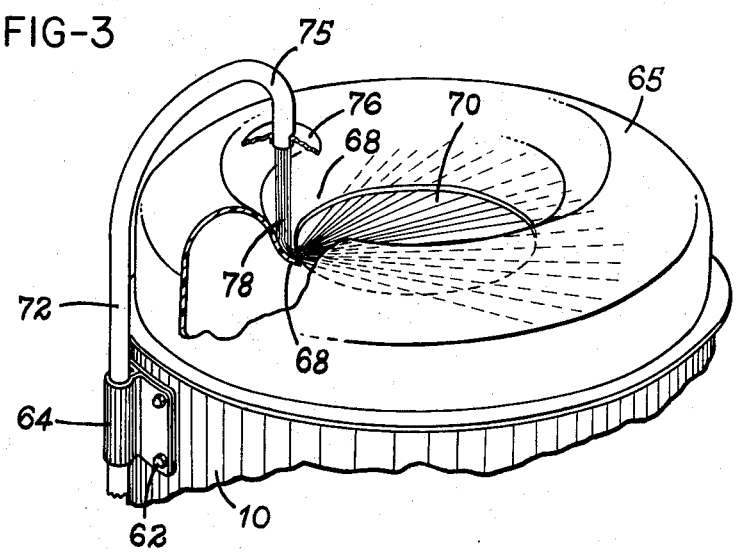
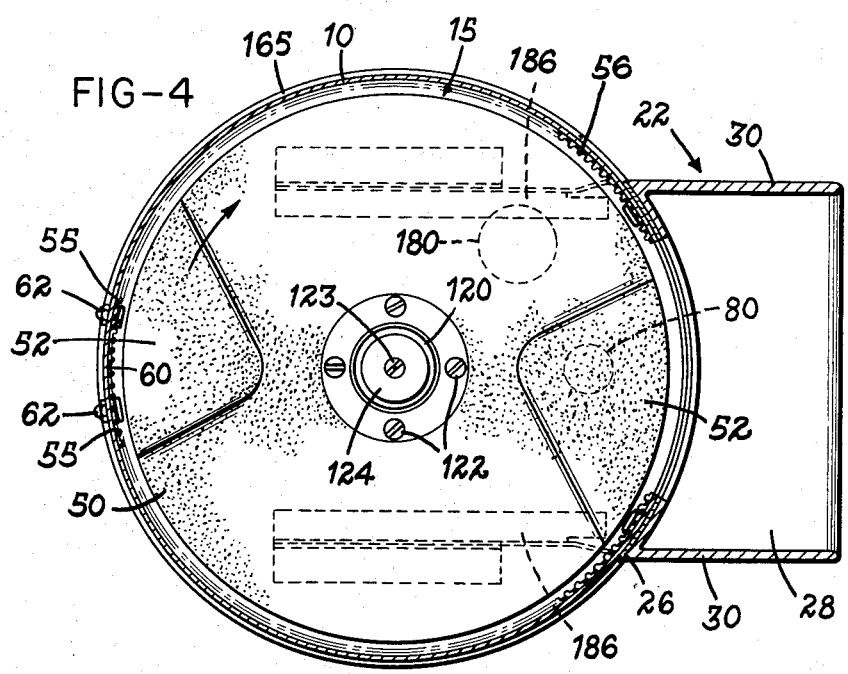
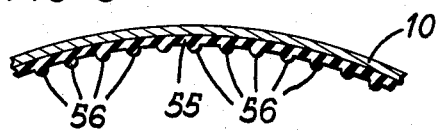

June 10, 1958 G. B. FOX ET AL 2,838,083
VEGETABLE PEELER HAVING SPRAY DISPERSER
Filed Sept. 12, 1955 4 Sheets-Sheet 3
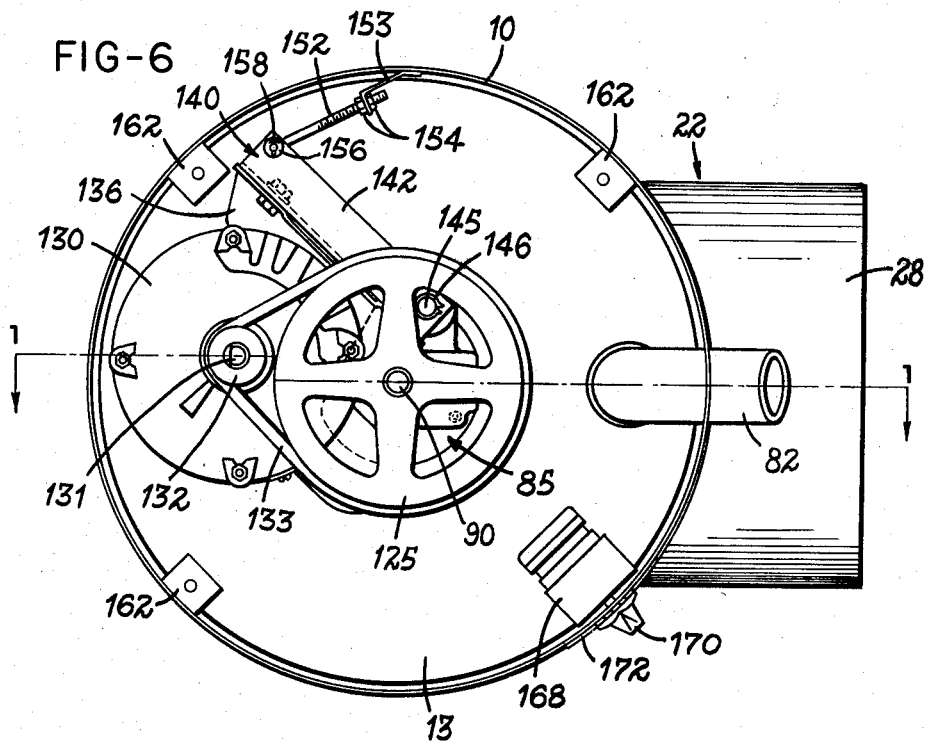
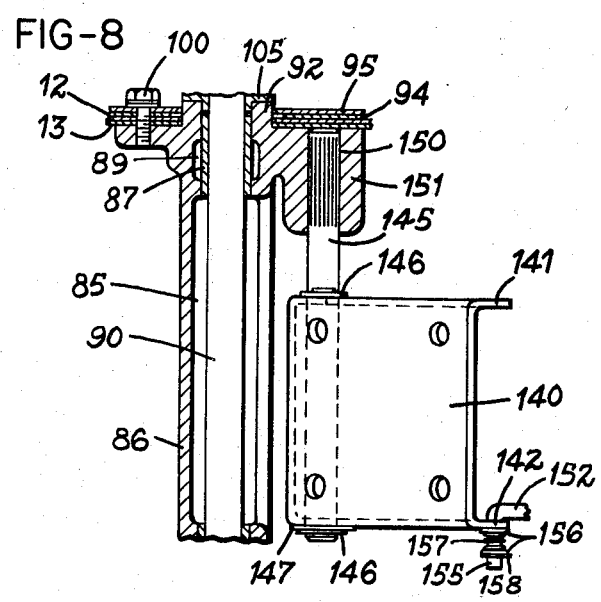
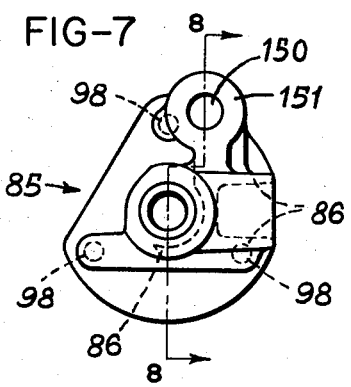
INVENTORS
GERALD B. FOX,
BY FRANKLIN D. HOUSER &
DAVID A. MEEKER
ATTORNEYS June 10, 1958     G. B. FOX ET AL     2,838,083
VEGETABLE PEELER HAVING SPRAY DISPERSER
Filed Sept. 12, 1955     4 Sheets-Sheet 4
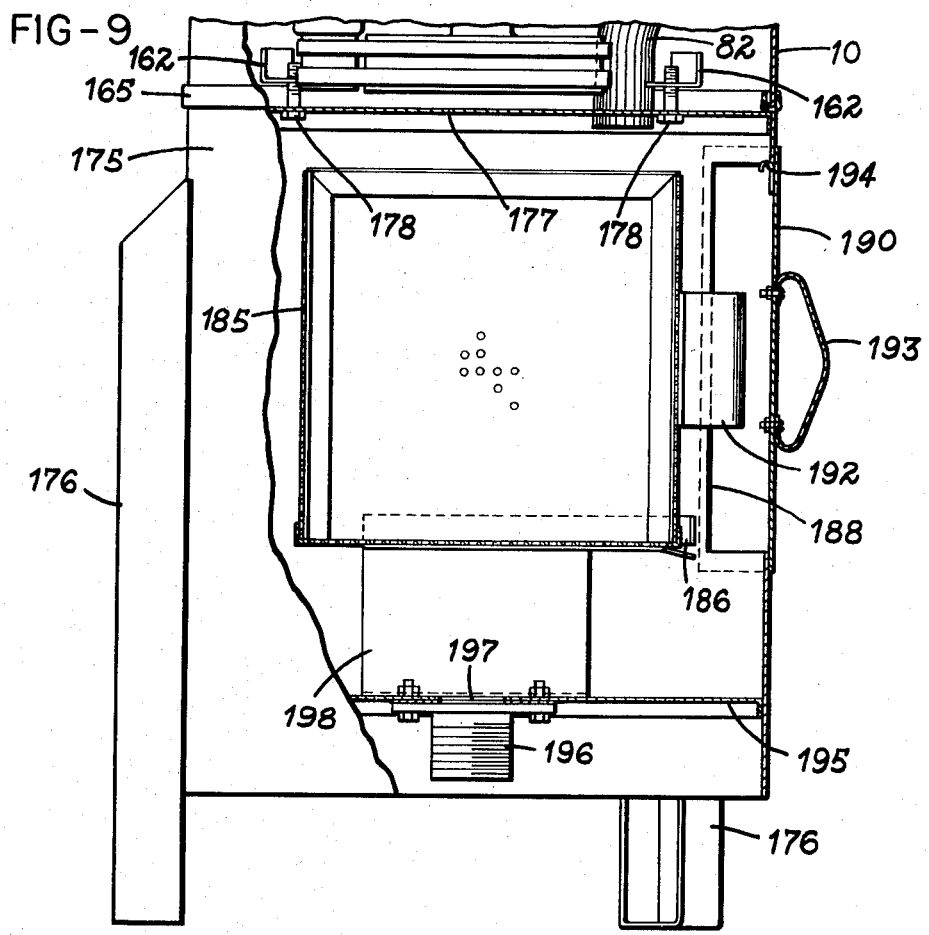
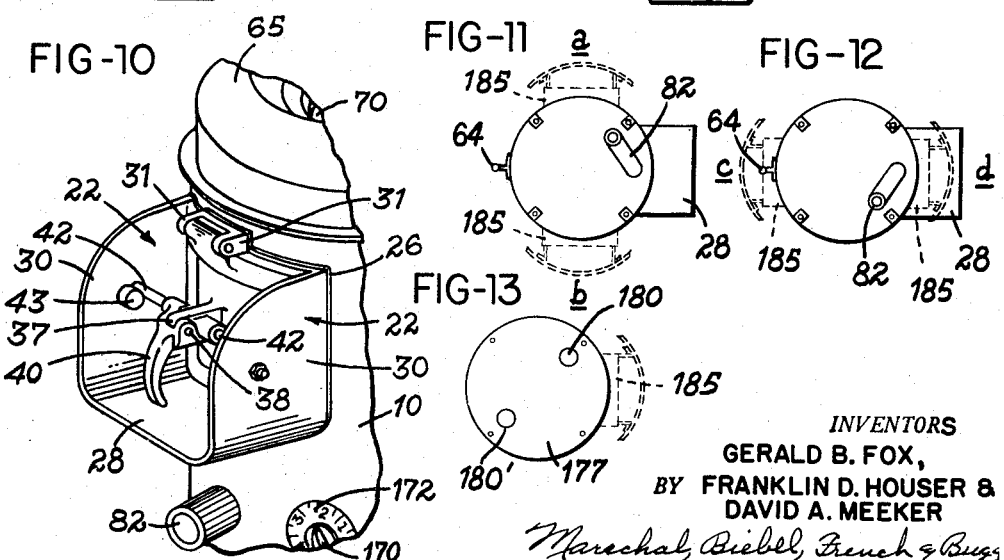
INVENTORS
GERALD B. FOX,
BY FRANKLIN D. HOUSER &
DAVID A. MEEKER
Marechal, Biebel, French & Bugg
ATTORNEYS

United States Patent Office 2,838,083
Patented June 10, 1958

2,838,083

VEGETABLE PEELER HAVING SPRAY DISPERSER

Gerald B. Fox, Franklin D. Houser, and David A. Meeker, Troy, Ohio, assignors to The Hobart Manufacturing Company, Troy, Ohio, a corporation of Ohio Application September 12, 1955, Serial No. 533,845

6 Claims. (Cl. 146—50)

This application relates to a machine for peeling and cleaning vegetables, fruits and the like.

In accordance with the invention the peeling machine has a cylindrical housing including a chamber having a disk rotably mounted at its bottom. The disk is spaced about its entire periphery from the inner wall of the chamber, and has an abrasive working surface which removes the outer skin of the vegetables or fruits, such, for example, as potatoes. The disk is revolved by suitable drive means and in the process of removing the skin it roughens the surface then exposed (herein referred to as the undersurface), leaving a fuzz thereon. The inner walls of the chamber above the disk are provided with a ribbed liner, the ribs extending radially inwardly of the chamber for a slight distance, and being relatively closely spaced and arranged substantially vertically with respect to the plane of the disk. The ribbed liner serves to rub or smooth the roughened undersurface, scraping and removing the fuzz from the vegetables as they are tumbled against the walls of the chamber, due to the centrifugal force acting on the vegetables from rotation of the disk.

The peeling machine is provided with a lid including the downwardly and inwardly extending lip portion defining a central opening in the lid to act as an access opening for loading the vegetables into the machine. A supply of flushing fluid is directed from a tube to impinge upon the lip portion of the lid, and the stream of fluid is thereby dispersed in a wide generally flat spray pattern to provide a screen of liquid across the opening which prevents back splash of liquid and entrained peelings through the opening. Furthermore, the flat spray strikes the revolving batch of vegetables in the machine and the fluid is deflected about the entire periphery of the chamber, adjacent the upper edge of the liner, and effectively washes the fuzz from the liner into the bottom of the chamber and thence to a drain.

It is the principal object of the invention to provide such a peeling machine in which there is an adequately large opening for introducing the vegetables or the like to be peeled and in which the opening is effectively protected by means of a liquid screen or water curtain so that objectionable splashing back of water, peelings and the like does not occur.

It is a further object to provide a peeling machine having a chamber for receiving the material to be peeled in which a rotary abrasive disk serves to remove the skin of the material and raise a fuzz on the undersurface of the material, with the material then traveling outwardly toward the stationary wall of the chamber where it encounters a particular wall contour which rubs or scrapes off the fuzz as the materials are repeatedly tumbled against the wall.

Another object of the invention is to provide such a peeling machine wherein the flushing liquid is deflected upon contact with the revolving batch of vegetables to spray about the entire upper periphery of the chamber and wash the fuzz from the ribbed walls.

An additional object of this invention is to provide a peeling machine of improved construction wherein a cylindrical housing is provided with a transverse partition dividing the housing into upper and lower chambers and a rotating shaft extends vertically through an aperture in the partition provided with a rotary seal, and wherein the complete drive unit for the shaft is suspended as a sub-assembly from the partition thereby to assure the proper alignment of the shaft and the seal at all times.

A further object of the invention is to provide a rotary seal construction for such a peeling machine wherein certain of the rotary members of the machine are suspended to exert a sealing pressure upon the sealing ring due to their own weight, thus eliminating the need for additional spring pressure to maintain the rotary seal about the drive shaft.

Other objects and advantages of the invention will be apparent from the following description, the accompanying drawings and the appended claims.

In the drawings—

Fig. 3 is a perspective view partly in section and partly broken away of the lid of the peeling machine;

Fig. 4 is a section taken on line 4—4 of Fig. 1, with the door open, and with certain base parts shown in dotted lines;

Fig. 5 is a fragmentary view, on an enlarged scale, of the liner seen in Fig. 4;

Fig. 6 is a view from the bottom of Fig. 1;

Fig. 7 is an enlarged detail view showing the drive unit carrier as viewed from the bottom;

Fig. 8 is a section taken on line 8—8 of Fig. 7;

Fig. 9 is a view, partly in elevation and broken away to show a vertical section taken along a vertical plane passing through the center of a base and strainer assembly which may be provided for the machine shown in Fig. 1;

Fig. 10 is a fragmentary perspective view on a smaller scale of the door and chute seen in Fig. 1;

Figs. 11 and 12 are schematic illustrations on a substantially reduced scale of the top of the base, showing different possible orientations of the peeler on the base; and Fig. 13 is a schematic illustration on the same scale as Figs. 11 and 12 showing the top of the base.

Figure 1:
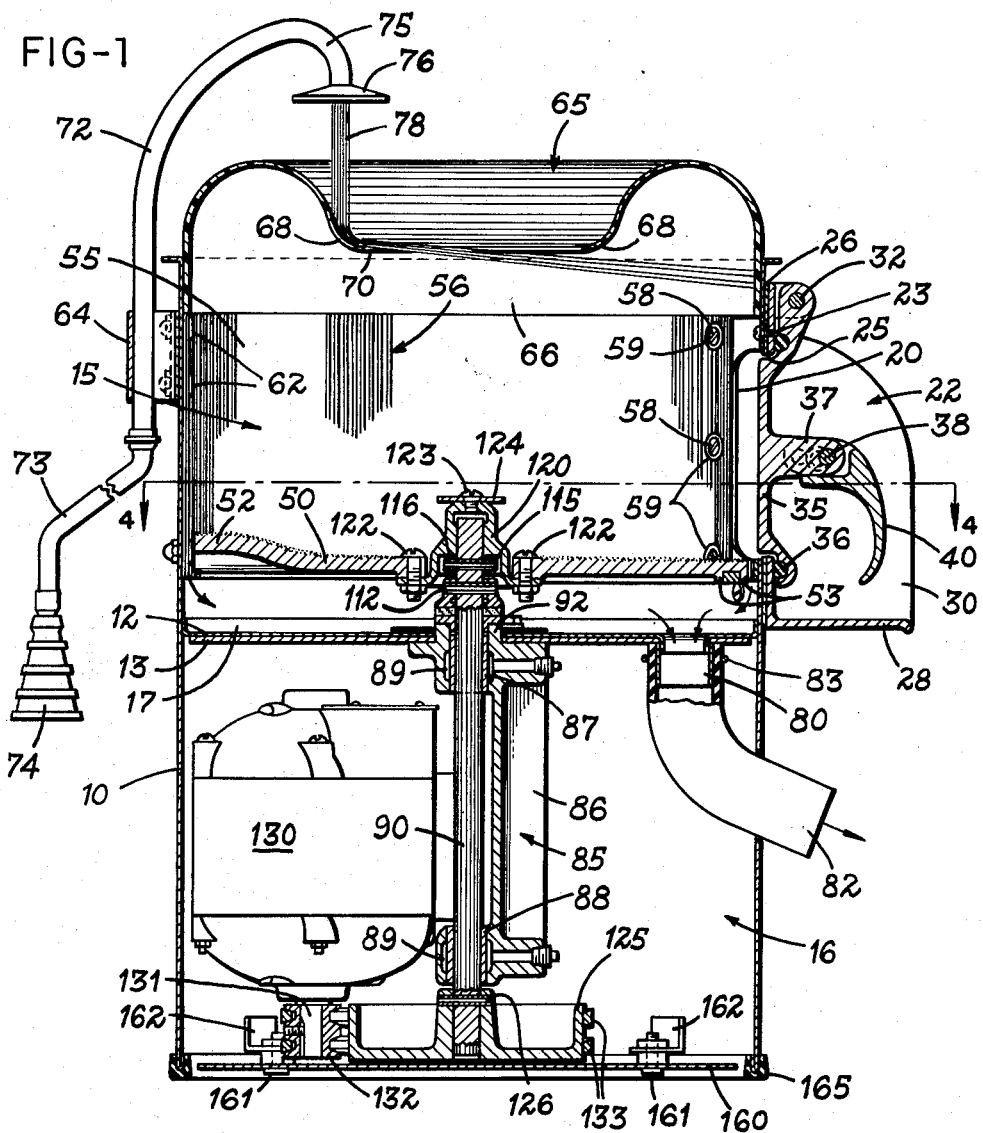
Fig. 1 is a vertical section through a peeling and cleaning machine in accordance with the invention, taken on line 1—1 of Fig. 6.

Referring to the drawings, which illustrate a preferred embodiment of the present invention, the machine provided by this invention is shown as comprising a vertical cylindrical housing 10 divided by a central partition 12 into upper and lower chambers 15 and 16 which provide, respectively, the peeling and cleaning chamber and an enclosure for the drive sub-assembly of the machine. Partition 12 includes a reinforcing plate 13 welded thereto, and a flange 17 which is seam welded or otherwise suitably attached about its entire periphery to the inner wall of housing 10, providing a water-tight seal between the upper and lower chambers. One side of chamber 15 is provided with an opening 20 to which a chute member 22 is attached by suitable screws, one of which is shown at 23 in Fig. 1. Chute member 22 likewise has an opening 25, in registry with the opening 20, and the joint between the housing and the chute about the openings 20 and 25 is sealed with a gasket 26.

Chute member 22 includes a bottom wall 28 and opposite generally vertical side walls 30, and at the top of the chute member a boss including outwardly projecting arms 31 (Fig. 10) carries a shaft 32 on which a door 35 is hinged for opening and closing movement toward and away from the opening 25. A suitable compressible gasket member 36 is received within a groove about the periphery of the door to seal the opening 25 in the closed position of the door against passage of fluid from within the chamber 15.

Door 35 includes an outwardly extending boss 37 carrying a stub shaft 38 providing a pivot for a handle 40. A pair of identical outward extensions or rods 42 project from opposite sides of handle 40, and thus are arranged to move in an arc about the stub shaft 38. On each side wall 22 there is a stud 43 located in approximately the same horizontal plane as shaft 38, in the closed position of the door, and the ends of rods 42 are arranged to cam upwardly and inwardly behind studs 43, as shown in Fig. 10, to lock the door in its tightly closed and sealed position.

Within chamber 15 a disk member 50 is rotatably mounted for revolving in a horizontal plane. The disk 50 has a roughened upper surface, preferably provided by casting silicon carbide grit or the like into the surface of the disk. A plurality of humps or upward protrusions 52 are provided on the upper surface of disk 50, one edge of each such protrusion having a gradually rising slope, and the other edge thereof sloping more abruptly toward the surface plane of the disk. Thus, a change in the direction of the disk will result in a somewhat different type of peeling action. For example, the batch will be agitated to a greater degree when the abruptly sloped edge is the leading edge, and conversely, there will be somewhat less agitation when the gradually sloped edge leads. A pair of spaced ridges 53 depend from the lower surface of disk 50 adjacent the periphery of the disk, and balancing of the disk is easily accomplished by adding weight to the peripheral points thereon, as by adding weights between the ridges at the desired points.

The inner walls of chamber 15, with the exclusion of the areas immediately above and below opening 20, are covered by a liner member 55 which includes a number of inwardly extending, relatively closely spaced ribs 56 (see Fig. 5). The surfaces of the ribs are rounded to a degree to effectively remove the fuzz but to preclude bruising or cutting of the vegetables. These ribs preferably extend generally vertically, that is, they are arranged substantially at right angles with respect to the plane of rotation of disk 50 and they preferably extend radially inwardly of the chamber for a distance less than the spacing between adjacent ribs 56. The ribs are relatively small and are present in large numbers so that ordinarily a number of ribs engage a single potato at the same time, guiding its path in a regular manner and retarding the speed of rotation of the batch thus promoting the proper relative motion and working engagement with the disk. As a specific example, in a chamber of about 15 inches in diameter the ribs 56 extend inwardly of the liner about 1/16 inch, and the spacing between centers of adjacent ribs is about 1/4 inch so that a number of ribs contact each vegetable as it is tumbled against the chamber wall. Substantial change may be made in these dimensions without departing from the scope of this invention.

The liner is preferably made of synthetic rubber or material having similar surface frictional properties, together with a certain amount of resilience and good resistance to rotting.

The liner 55 is divided into two separate pieces for ease of manufacture and installation, each of the pieces being complementary, and these liner sections are attached to the housing 10 by suitable adhesive and also by suitable screws 58 and cup washers 59 at the edges of the liner next to the outlet 20. These screws 58 perform the dual function of securing the edges of the liner and also attaching chute member 22 to the housing. The other edges of the liner members abut at a point indicated by the numeral 60 in Fig. 4, and these edges of the liner members are secured by screws 62 which also attach a bracket 64 to the outer surface of housing 10.

The upper edge of the liner provides a shoulder within the chamber 15, and a lid 65 is provided for the chamber including an annular peripheral portion 66 which fits frictionally within the upper end of chamber 15 and rests on the upper edge of the liner 55. The lid 65 is molded to the curved generally torodial shape shown in Figs. 1 and 3. It is preferably constructed from material which is suitably formed in this way. Satisfactory results have been obtained by manufacturing this lid from a plastic material such as fiber glass, although materials such as aluminum or other sheet metal materials could be used. The lid includes a downwardly and inwardly extending lip portion 68 which defines an opening 70 of substantial and adequate size, located centrally of the lid and through which the vegetables or fruits to be peeled are readily loaded into the machine. In a commercial form of machine particularly intended for the peeling of potatoes for restaurants and the like, and having a capacity of fifteen to twenty pounds, opening 70 has a diameter of approximately six inches.

The lip portion 68 is preferably curved inwardly toward the center of lid 65 at such an angle that a tangent projected from the edge of the lip extends beneath the opposite edge and intersects the opposite section of annular portion 66.

A water supply tube 72 is carried by bracket 64, and a suitable flexible hose 73 having an inlet fitting 74 is attached to the bottom of tube 72 for supplying water from any suitable tap or other water supply. Tube 72 includes a curved upper end 75 which opens vertically downwardly and is spaced above the lip portion 68 of lid 65, and a disk 76 is permanently attached to the end of the curved portion 75. With such a construction the peeling machine complies with the sanitary codes, since these codes often require that all water supplies in restaurant food processing rooms and the like be provided with an air gap, to prevent back siphoning through the water supply tube, from waste water or material in the room, to the city water system. Such back siphoning can occur if there is a sudden negative pressure at some other place in the city supply system, and could result in the drawing of contaminated water into the city water system. The machine here has such an air gap by virtue of the space between the end of tube 72 and lid 65. However, if an operator were to attach a water hose to the end 75 of the tube and use the water supply to the peeling machine for other purposes, then the required air gap would not be present. Disk 76 obviates this difficulty by preventing attachment of any flexible tube or the like to the end of the water supply tube.

The vertical alignment of curved tube portion 75 and lip portion 68 is such that the stream of water 78 issuing from the tube impinges on lip portion 68 and is dispersed in a wide generally flat or fan shaped spray pattern across the opening 70. The spray of water is deflected downwardly during its traverse of opening 70 to such an extent that the water enters the opening and strikes against the annular portion 66 of the lid, and enters the chamber 15. This water acts as a flushing liquid for washing the peelings from the vegetables and from the ribbed liner 55, as will presently be described.

The above mentioned spray pattern is such that a liquid screen or curtain of water is provided which substantially covers opening 70, as illustrated in Fig. 3. This liquid screen prevents back splash of the flushing liquid and the peelings from within chamber 15, in addition to continuously supplying flushing liquid to the chamber for washing the fuzz from the walls of the liner. The spray of flushing liquid is directed against the opposite sides of the lid, as shown in Fig. 1, and the revolving batch of vegetables intercepts and deflects this spray, effectively carrying the liquid around the entire periphery of the chamber and washing the fuzz from the entire surface of the liner as well as washing away peelings retained on the vegetables, and on disk 50.

The flushing liquid, together with entrained peelings, passes downwardly around the edge of disk 50, which is spaced radially inwardly from the lower edge of liner 55, and flows across partition 12 into an outlet fitting 80 to which an outlet hose 82 is secured by a clamp ring 83. The flushing liquid and entrained peelings then pass through hose 82 to a suitable place of disposal.

Figure 2:
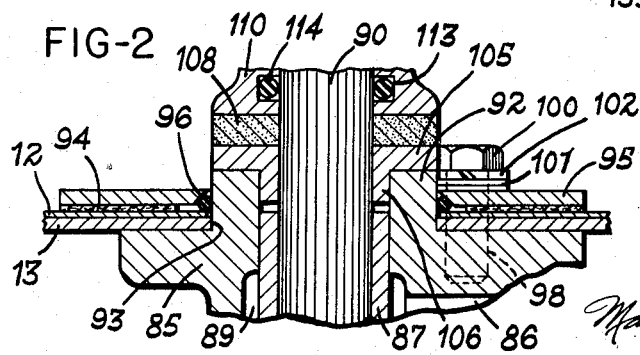
Fig. 2 is an enlarged detail of the drive shaft seal in Fig. 1.

The drive unit for the machine is provided as a complete sub-assembly, and is supported by a carrier member 85 having a plurality of reinforcing webs 86. An upper bearing sleeve 87 and a lower bearing sleeve 88 are carried by member 85, surrounded by chambers 89 containing a permanent lubricant. A drive shaft 90 is journaled in bearings 87 and 88. The upper end of carrier 85 includes an upwardly projecting annular boss 92 which is received through a central circular opening 93 (Fig. 2) in partition 12 and reinforcing plate 13. A flat annular gasket 94 rests upon partition 12, sandwiched between the partition and a washer 95 having a beveled aperture 96 therein. An O-ring seal member is adapted to be compressed between the beveled surface of aperture 96 and a boss 92 to provide a water tight seal around the boss. A plurality of tapped holes 98 are provided in carrier 85 to receive mounting bolts 100 which extend through suitable mating holes in partition 12, plate 13, washer 95 and gasket 94. There are actually three such bolts 100, each being provided with a pair of sealing washers 101 and a lock washer 102, and these three bolts suspend the carrier 85 and the entire drive assembly from the partition and its reinforcing plate.

A seal flange 105 surrounds the shaft 90 and rests upon boss 92, with a downwardly extending portion 106 of flange 105 projecting between the inner surface of boss 92 and the shaft 90, immediately above bearing sleeve 87. On top of flange 105 there is a sealing ring 108 which performs the dual function of providing a water tight seal about the rotating shaft 90 and also acting as a thrust bearing. Ring 108 is preferably made of graphite or some similar material having appropriate sealing and self-lubricating characteristics. A drive flange 110 rests upon ring 108 and is secured to shaft 90 by a transverse hollow pin 112 (Fig. 1) for rotation together with shaft 90. An annular recess 113 in flange 110 provides a carrier for an O-ring seal 114 which prevents leakage of fluid along shaft 90 past the flange 110.

The use of a sealing ring such as ring 108 requires the exertion of sufficient pressure on the ring to maintain the rotary seal. This is commonly done by pressing against the graphite sealing with a spring loaded washer or the like. In the present construction, however, no such spring loading is required since the weight of disk 50 and its hub 120, together with the weight of drive shaft 90 and pulley 125, is all supported by the drive flange 110 resting upon sealing ring 108. It has been found that the combined weight of all these members is more than sufficient to maintain a tight rotary seal about shaft 90.

Furthermore, it is necessary that shaft 90, flange 105, and flange 110 be at all times aligned with seal ring 108 to insure proper sealing pressure about the entire periphery of the ring. Partition 12 is rather thin, and even when provided with reinforcing plate 13 it is subject to a certain amount of deflection which could cause a misalignment of the sealing structure. However, suspension of the drive sub-assembly from the partition permits the shaft 90 and flanges 105 and 110 to move with any slight deflection of the partition and thus the sealing parts are maintained in alignment.

A hollow drive pin 115 extends transversely of the upper end of shaft 90, and is adapted to be received within a transverse slot 116 in a hub member 120 which is secured to the center of disk 50 by appropriate bolt and nut fasteners 122. Thus, the disk 50 and its hub 120 rest upon the upper end of shaft 90, and may be removed therefrom by merely lifting the disk vertically from the end of the shaft. If the hub should stick to shaft 90, a screw 123 and washer 124 in the hub may be removed, and a suitable bolt threaded into the tapped hole for screw 123 to release the hub and disk.

At the lower end of shaft 90 is a drive pulley 125 fastened to the shaft by a transverse hollow pin 126. A drive motor 130 having a vertical shaft 131 drives pulley 125 through a small drive pulley 132 on shaft 131 and a pair of V-belts 133.

Referring to Figs. 6 and 8, the mounting for motor 130 includes a plurality of feet 136 on the motor casing bolted to a generally U-shaped carrier plate 140 having upper and lower horizontally extending legs 141 and 142, respectively. At one side of plate 140 the legs 141 and 142 have aligned holes therein for receiving a motor mounting rod 145. This rod has a pair of circumferential grooves spaced apart a slightly greater distance than the width of plate 140, and thus when rod 145 is passed through the holes in legs 141 and 142 a pair of circular spring clips 146 are forced into the grooves on the rod to position the mounting plate thereon, extending vertically to one side of the drive shaft 90. A washer 147 is preferably placed between the lowermost clip 146 and leg 142 of the mounting plate to provide a relatively wide support surface for that plate.

The upper end of rod 145 is press fitted into a bore 150 through a pad or boss portion 151 which is integral with the carrier 85 and extends to one side thereof adjacent the upper bearing sleeve 87. Thus, the motor 130 is entirely supported by carrier 85 and the entire drive assembly including the motor, the drive shaft 90, and the pulley and belt connection between the motor and drive shaft are all removably connected to the machine by the three bolts 100, and the entire drive sub-assembly may be easily removed for servicing and the like. In order to adjust the tension in belts 133 an L-shaped rod 152 is adjustably connected to a bracket 153 secured to the inner wall of housing 10, by means of lock nuts 154. The other or smaller leg 155 of the rod extends through a hole in leg 142 of mounting plate 140, and is loosely secured to the plate by a pair of washers 156 on opposite sides of a spring 157. The lowermost of washers 156 is retained on the end of leg 155 by a cotter pin 158. To adjust the tension in belts 128, the lock nuts 154 are threaded on rod 152 to move the outermost end of the mounting plate 140 toward or away from bracket 153, thus pivoting the motor 130 and plate 140 about rod 145 and varying the tension in belts 28 by changing the spatial relation of pulleys 125 and 132.

A bottom cover plate 160 is secured across the bottom of chamber 16 by a number of bolts 161 attached to the radially extending legs of a plurality of angle brackets 162. The other legs of these brackets are welded or otherwise secured to the inner walls of housing 10. An annular rubber channel 165 is fitted over the lower edge of housing 10, thus providing a base upon which the machine stands during use.

In the operation of the machine a number of vegetables, for example, potatoes, are placed in upper chamber 15 by loading them through opening 70 in the lid. The supply of water through tube 72 is then initiated, and the water pressure is adjusted until the shape of the fluid spray across opening 70 is such that it forms a curtain or screen which substantially covers the opening. Motor 130 is then energized. The present machine may be provided with an ordinary electric switch for off-on control of motor 130, but is preferably equipped with a conventional timer switch, indicated generally at 168 in Fig. 6, and having a setting knob 170 extending on the outer surface of housing 10 and cooperating with a dial member 172 (Fig. 10) upon which suitable indicia is inscribed for setting the timer in terms of minutes, thereby energizing the drive motor for the desired period of time. Once the motor has been energized the disk 50 will be rotated, as previously explained, and the relatively rapid rotation of the disk will cause the potatoes to be tumbled over and over and outwardly, due to centrifugal force, against the ribbed liner 55.

The peeling and cleaning action may be briefly described as follows. The surface or skin of the potato is removed by contact with the abrasive surface of disk 50, and a fuzz is raised on the undersurface of the potato. Contact with the ribs 56 on liner 55 causes this fuzz to be rubbed off upon the liner, without bruising or cutting the potato, and resulting in a smooth outer surface on the potato which is highly desirable, since any fuzz remaining on the surface will oxydize rapidly. The ribbed construction of the liner also causes the potatoes adjacent the liner to move upwardly toward the top of the machine. When they reach the top of the liner, they are forced inwardly by potatoes moving up from beneath, and then fall downwardly toward the disk. All the while the entire batch of potatoes is rotating at a lesser speed than disk 50 due to the retarding action of the liner upon the potatoes contacting it.

The peelings rubbed off on the liner are entrained in the flushing liquid as previously described, which washes the peeling down through the annular space between the periphery of disk 50 and liner 55, and thence out through drain hose 82. Once the potatoes have been peeled, the water supply in tube 72 is turned off, and while the motor is still running handle 40 is lifted to unlatch and open door 45. The centrifugal action will cause the potatoes to be discharged through chute member 22 and into any convenient receptacle which may be placed beneath the chute member.

When timer 168 is used the motor will be stopped, and so to unload the potatoes it is advisable to turn off the water supply and run the motor for a length of time sufficient to discharge them from the machine.

The peeling and cleaning machine above described can be utilized as a relatively portable device, but in some instances it may be desired to provide a more permanent installation. In this event, a base is provided for the peeler, as illustrated in Fig. 9, including a cylindrical casing 175 supported by a plurality of legs 176. The casing is provided with a top wall 177 through which bolts 178 pass into engagement with the angle brackets 162. When the base is used the bottom cover 160 is removed and the housing 10 rests directly on top 177. The drain hose 82 is removed from the aperture in housing 10, as shown in Fig. 1, and is instead inserted through an opening 180 (Fig. 4) in top 177. The hose ends immediately above a foraminous basket or strainer 185 which is slidably mounted on rails 186 for movement transversely of the casing 175. A generally rectangular opening 188 is provided in the casing for passage of basket 185, and a door 190 contoured to fit over the opening 188, is attached to one side of basket 185 by a pair of brackets 192. A suitable handle 193 is bolted to the outer side of door 190, and a spring clip 194 is provided for retaining the door in its closed position. A bottom partition 195 is seam welded across the bottom of casing 175 to provide a water tight chamber therein, and a suitable drain fitting 196 is bolted to partition 195 in registry with a central aperture 197 therein. A pair of vertically extending plates 198 are attached to the bottom partition, providing support for the rails 186.

When the base is used with the peeling machine, the flushing liquid and entrained peelings are discharged into basket 185, and the peelings strained from the fluid which then passes through fitting 196 to any suitable drain. After peeling operations are completed the basket 185 is easily withdrawn by sliding it outwardly through opening 188 for cleaning and disposal of the collected peelings from the basket.

The construction of the base member provides for a considerable flexibility in the arrangement of the peeling machine on the base.

Thus, Figs. 11 and 12 illustrate in dotted lines four different possible locations marked *a*, *b*, *c*, and *d*, of basket 185 with respect to the chute on the peeling machine. The clamped connection between drain hose 82 and the drain tube 80 allows the hose to be turned on tube 80 through an angle of about 90°, between the positions of the hose shown in Fig. 11 and in Fig. 12. An opening 180' is provided in top 177 at the opposite side of the top from opening 180, and also vertically aligned with basket 185. With the hose 82 in the position shown in Fig. 11, and the base turned to locate the basket in its position *a*, the hose will be passed through opening 180. Likewise, for position *b* of the basket hose 82 will pass through opening 180', for position *c* the hose will pass through opening 180', and for position *d*, which is also shown in Fig. 4, hose 82 will pass through opening 180.

This arrangement provides for maximum versatility in applications of the peeling machine where the base is required, since the chute and the basket can be located in that relative position which affords the best access to them.

It will thus be seen that the present invention provides a peeling and cleaning machine which is extremely versatile in application, usable either as a portable unit or in a permanent installation. The machine is capable of peeling 15 to 20 pounds of potatoes, for example, in from one to three minutes, depending upon the condition of the potatoes. The same peeling time is applicable to other vegetables, fruits, or other food stuffs requiring peeling or cleaning. The water screen across the loading opening substantially reduces the liquid thrown outwardly of the machine during its operation, thereby greatly increasing the cleanliness of the operation by preventing unwanted and undesirable wetting of the area surrounding the machine. The materials employed in the manufacture of the machine are preferably those which are relatively resistant to deterioration due to wetting. For example, stainless steel, aluminum castings, and molded plastic are all utilized.

The drive sub-assembly including the carrier member 85 provides for ease of servicing, and the sealing ring arrangement, wherein pressure is applied to the ring 108 by the weight of the abrasive disk and the drive shaft, eliminates the need for any additional spring pressure upon the sealing ring.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an open top machine for peeling and cleaning vegetables and the like, the combination of a housing providing a chamber for reception of the vegetables to be peeled and cleaned, means in said chamber for peeling the skin portions from the vegetables, a lid covering said open top of said chamber including a downwardly and inwardly flared lip defining an opening in said lip for loading the vegetables into said chamber, a liquid supply tube including means for connection thereof to a source of flushing liquid and having an open end positioned above said lid and arranged to direct a stream of liquid against said lip at an angle such that said liquid is dispersed in a wide generally flat spray pattern across said opening forming a liquid curtain for preventing back splash from within said chamber, said spray of liquid traveling toward the walls of said chamber and affording a supply of flushing liquid for washing the peelings from said vegetables and the surrounding walls of said chamber, and drain means adjacent the bottom of said chamber for conducting the flushing liquid and the peelings entrained therein from said chamber.

2. In a peeling machine of the character described, a housing having an opening in the top thereof, an abrasive disk mounted for rotation in said housing below said opening, the periphery of said disk being spaced from the walls of said housing sufficiently to provide for flow of flushing liquid and peelings therebetween, drain means in said housing below said disk, a lid extending across said opening in said housing and including a downwardly and inwardly flared lip defining an opening in said lid for loading vegetables into the machine, and a liquid supply tube including means for connection thereof to a source of flushing liquid and having an open end positioned above said lid and arranged to direct a stream of flushing liquid against said lip at an angle such that said liquid is dispersed in a wide spray pattern across said opening to provide a screen of liquid at said opening for preventing back splash of liquid from within the housing and forming a high level supply of flushing liquid within said housing.

3. In a peeling machine of the character described, a cylindrical housing including a closed bottom and an open top providing a chamber, a disk having an abrasive surface mounted for rotation in the bottom of said chamber, a lid extending across said open top of said chamber and including a downwardly and inwardly curved lip defining a central opening in said lid for loading vegetables into the machine, a liquid supply tube including means for connection thereof to a source of flushing liquid, said tube directing a stream of flushing liquid against said lip at an angle such that said liquid is dispersed in a wide spray pattern across said opening to provide a screen of liquid at said opening for preventing back splash of liquid from within the chamber, and drain means in said bottom of said housing beneath said disk providing for flow of the flushing liquid from said chamber.

4. In a peeling machine of the character described, a cylindrical housing including a closed bottom and an open top providing a chamber, means in said chamber for peeling the skin portions from vegetables and the like, a lid extending across said open top of said chamber and including a downwardly and inwardly curved lip defining a central loading opening in said lid, said lip being curved with respect to said opening such that any tangent to the curved contour of said lip extends downwardly into said chamber below the opposite edge of said opening, a liquid supply tube including means for connection thereof to a source of flushing liquid, said tube having an open end vertically spaced and aligned with respect to said lip to direct a stream of flushing liquid against said lip, the stream of liquid being dispersed upon impingement thereof on said lip into a generally flat fan-shaped spray extending across said opening and beneath the opposite portion of said lip, said liquid spray providing a water curtain across said opening for preventing back splash from within said chamber, said spray also forming a high level supply of flushing liquid for washing peelings from the interior of said chamber, and drain means in said bottom for conducting the flushing liquid and the peelings entrained therein from said chamber.

5. In a machine for peeling and cleaning vegetables and the like, the combination of a cylindrical housing providing a chamber for receiving the vegetables, a disk rotatably mounted at the lower end of said chamber, said disk having an abrasive surface thereon for removing the skins of the vegetables leaving a roughened surface with a fuzz thereon, the periphery of said disk being spaced from the inner wall of said chamber, a liner of relatively resilient material in said chamber including a plurality of ribs extending substantially at right angles to said disk for smoothing said roughened surface on the vegetables, said ribs being relatively closely spaced with respect to each other and extending radially inwardly of said chamber for a distance substantially less than the spacing between adjacent said ribs, said liner providing an annular shoulder adjacent the top of said chamber, a lid for said chamber including an outer annular portion for seating on said shoulder, said lid including a downwardly and inwardly flared lip defining a central opening therein for loading the vegetables into said chamber, and means for directing a stream of flushing liquid against said lip at an angle such that said liquid is dispersed in a wide generally flat spray pattern across said opening to provide a screen of liquid for preventing back splash of liquid through said opening, said flat spray of flushing liquid entering said chamber at the upper portion thereof and being deflected over substantially the entire circumference thereof by the moving vegetables in said chamber to provide a flow of flushing liquid downwardly along said liner to wash the peelings therefrom.

6. In a machine for peeling and cleaning vegetables and the like, a cylindrical housing, a partition secured across said housing dividing it into a water-tight upper chamber and a lower chamber, said partition having a central aperture connecting said chambers, a carrier member suspended from said partition and including a boss portion extending through said aperture, a drive shaft supported by said carrier member and extending through said boss portion into said upper chamber, a disk member in said upper chamber resting upon the upper end of said shaft, a sealing ring surrounding said shaft above said boss, a drive flange fixed to said shaft above said sealing ring and resting on said sealing ring to provide vertical support for said drive shaft, the weight of said flange and said disk member maintaining a sealing pressure on said sealing ring, said carrier member being fixed with respect to said partition for movement therewith in response to deflection of said partition for maintaining alignment of said flange and said sealing ring, and drive means at the lower end of said shaft for rotation thereof to rotate said disk in said upper chamber.

References Cited in the file of this patent

UNITED STATES PATENTS

| | | |
|---|---|---|
| 954,047 | Powell | Apr. 5, 1910 |
| 1,476,221 | Roylance | Dec. 4, 1923 |
| 1,701,435 | Anstiss | Feb. 5, 1929 |
| 2,497,168 | Harris | Feb. 14, 1950 |

FOREIGN PATENTS

| | | |
|---|---|---|
| 579,908 | Great Britain | Aug. 20, 1946 |
| 133,997 | Australia | Aug. 26, 1949 |
| 513,221 | Belgium | Aug. 14, 1952 |

UNITED STATES PATENT OFFICE

CERTIFICATE OF CORRECTION

Patent No. 2,838,083 June 10, 1958

Gerald B. Fox et al.

It is hereby certified that error appears in the printed specification of the above numbered patent requiring correction and that the said Letters Patent should read as corrected below.

Column 8, line 62, strike out "an open top", line 63, after "of" insert -- an open top --; column 10, line 20, for "donwardly" read -- downwardly --

Signed and sealed this 19th day of August 1958.

(SEAL)

Attest:

KARL H. AXLINE

Attesting Officer

ROBERT C. WATSON

Commissioner of Patents